Feb. 23, 1965    S. BALOGH ETAL    3,170,872
CERAMIC BLOCK FILTER DRIER
Filed Aug. 3, 1962    3 Sheets-Sheet 1

INVENTORS
STEPHEN BALOGH
RONALD M. WILBER
BY
ATTORNEY

INVENTORS
STEPHEN BALOGH
RONALD M. WILBER
ATTORNEY

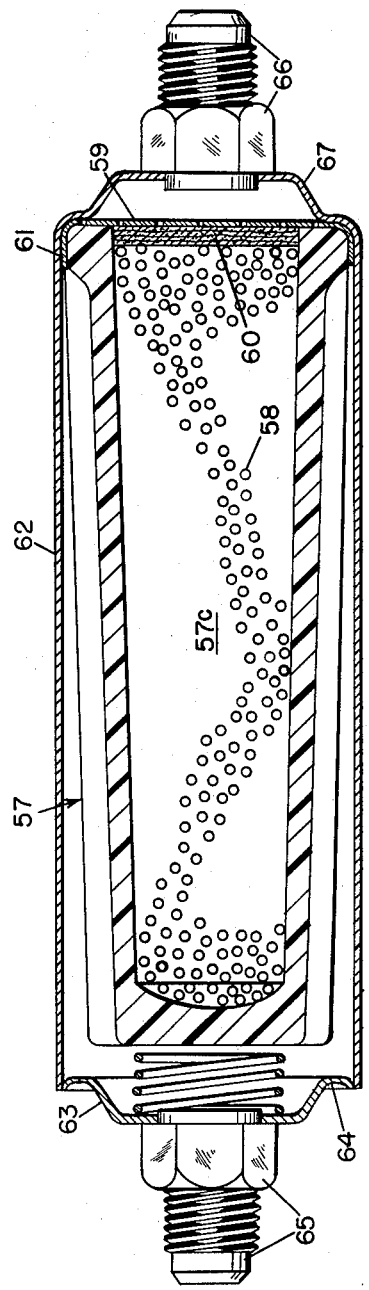
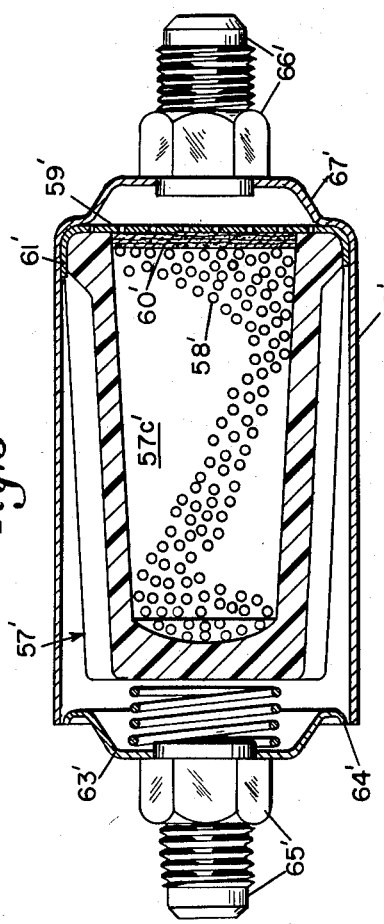

United States Patent Office 3,170,872
Patented Feb. 23, 1965

3,170,872
CERAMIC BLOCK FILTER DRIER
Stephen Balogh and Ronald M. Wilber, Lyons, N.Y., assignors, by mesne assignments, to Parker-Hannifin Corporation, Cleveland, Ohio, a corporation of Ohio
Filed Aug. 3, 1962, Ser. No. 214,663
2 Claims. (Cl. 210—266)

This invention relates to a ceramic block filter drier and it consists in the combinations, constructions and arrangements of parts herein described and claimed.

Generally there is provided a hollow filter block molded of ceramic material of desired porosity and closed at one end by an integral wall. The filter block is desirably circumferentially undulated to maximize its filtering area. The inner chamber is fully or partially filled with loose type desiccants, such as molecular sieve, activated alumina and silica gel. The desiccant is retained in the chamber of the block by a wire or glass cloth filter and by a perforated cap underlying or overlying the same. A shock pad of fiberglass may fill the chamber space not occupied by the desiccant to eliminate looseness.

The capped rim of the assembled filter drier block is sealingly press fitted within a subsequently sealed metallic cartridge having inlet and outlet fixtures at opposite ends thereof. A compression coil spring may be employed to maintain the press fit and seal by preventing axial displacement of the block within the cartridge.

It is an object of the present invention to provide a highly effective filter drier that can be manufactured at lower cost than conventional filter driers.

It is another object of this invention to provide a filter drier in which the pore size for filtration qualities can be held to much greater uniformity than is possible with the use of molded desiccant filters.

It is a further object of the invention to provide a filter drier capable of withstanding excessive shock as compared with molded desiccant types.

It is yet another object of the invention to provide a device of the character described in which the filter block is molded in intricate shapes to increase the filter area for a given overall size.

Figure 1:
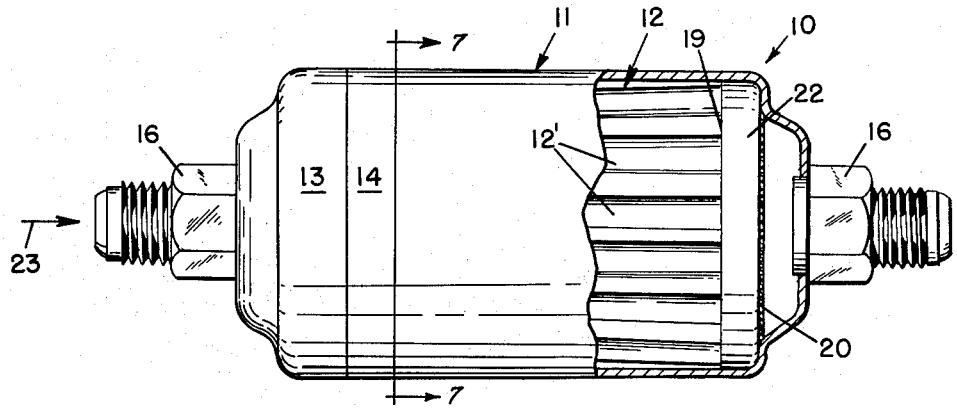
Figure 2:
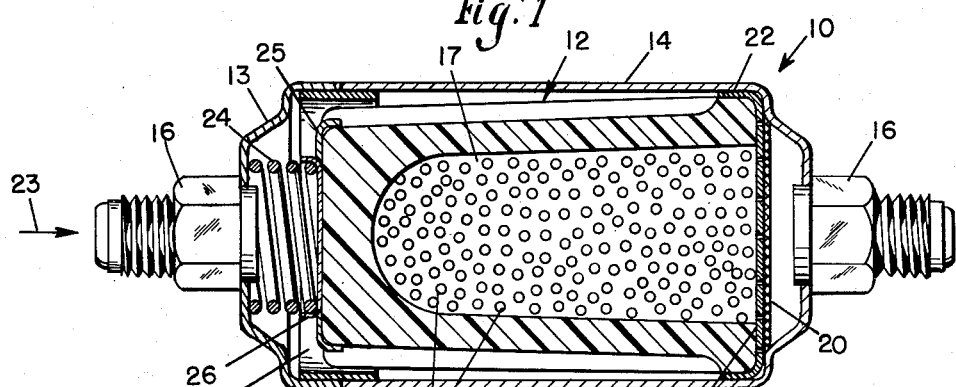
Figure 3:
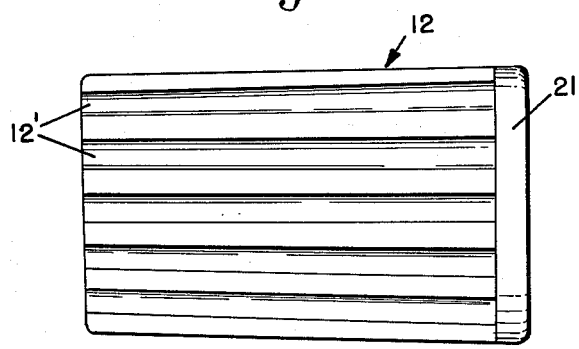
Figure 4:
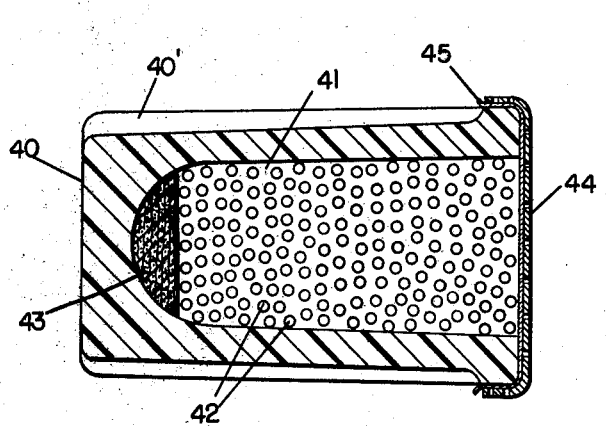
Figure 5:
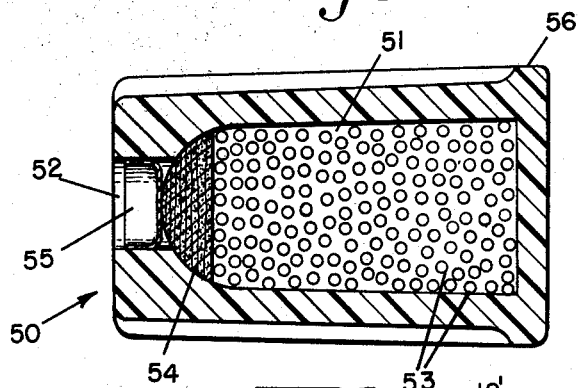
Figure 6:
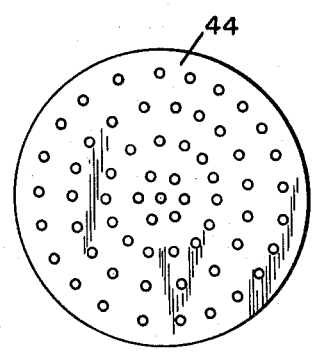
Figure 7:
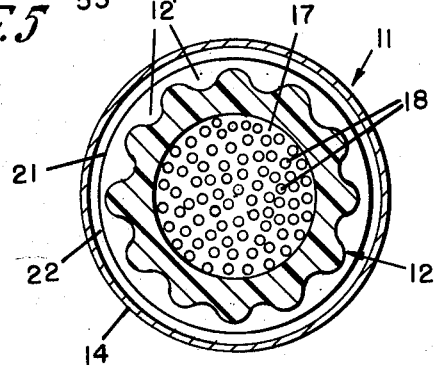

Other and further objects of the invention will become apparent from a reading of the following specification taken in conjunction with the drawings, in which:

FIGURE 1 is a side view, partly broken away, of a preferred embodiment of the invention, FIGURE 2 is a side view of the unit of FIGURE 1 in vertical axial section between the end fixtures, FIGURE 3 is a side view of the filter block of FIGURE 1, FIGURE 4 is a side view, in vertical axial section, of a modified form of the block assemblage, FIGURE 5 is a view similar to FIGURE 4, illustrating a further modification of the block assemblage, FIGURE 6 is an end elevational view of the assemblage of FIGURE 4 viewed from the right end thereof, FIGURE 7 is an elevational view, in section, taken on line 7—7 of FIGURE 1, FIGURE 8 is a side view of another species of the invention, in longitudinal axial section, and FIGURE 9 is a side view of a further modification of the invention, in longitudinal axial section.

With reference now to FIGURES 1, 2, 3 and 7 of the drawings, the numeral 10 generally designates a preferred embodiment of the assembled filter drier. The filter drier 10 comprises basically an elongated cylindrical metallic case 11 and a hollow conically tapered porous ceramic filter block 12 sealingly press fitted at its larger end into one end of the case 11.

The case 11 is herein disclosed as being formed of a pair of die-formed cup-shaped shells 13 and 14 of different axial dimensions and joined together by a short close fitting internal sleeve 15 soldered or otherwise sealingly connected thereto. If preferred, the shells could be of equal lengths and could be joined by mating threaded ends, or by an external sleeve band with or without threads, etc. Each of the shells 13 and 14 is provided with a conduit coupler 16 of generally conventional construction sealingly coaxially fixed to the end wall of each of the shells 13 and 14, as shown.

The filter drier inner assemblage, press fitted into the case shell 14, comprises the hollow porous ceramic filter block 12, the chamber 17 of which is filled to any desired degree with desiccant material 18 in granular or other relatively loosely packing form. The desiccant material 18 is retained in the chamber 17 by a perforated metallic cap 19 and by a fine woven wire strainer disc 20 gripped marginally between the conically shaped end wall of the shell 14 and the cap 19, as shown in FIGURE 2. The larger end of the ceramic block 12 has a narrow cylindrical band-like surface 21 (FIGURE 3) of a diameter to produce a press fitted seal against the inner surface of a flange 22 on the cap 19. The flange 22 similarly provides a press fitted seal against the inner surface of the case shell 14. Thus, refrigerant flowing through the filter drier 10 in the direction of arrow 23 (FIGURE 2) is filtered by and through the porous side and end walls of the block 12 into the chamber 17 where contact with the granular desiccant material 18 dries the refrigerant as it flows through the chamber 17. The strainer disc 20 (which can be woven Monel wire screen of about 150 mesh) prevents desiccant material being carried along by the refrigerant as it leaves the filter drier 10 through its outlet fixture 16 at the right end of the shell 14.

The outer surface of the filter block 12 is longitudinally fluted at 12' to maximize the filter surface area. A coil spring 24 firmly holds the filter block with its larger end seated against the end of the shell 14 (FIGURES 1 and 2). The spring 24 is coaxially positioned in the shell 13 by a cap 25 which fits over the smaller end of the filter block 12 and has a smaller concentric seat 26 into which one end of the spring 24 snugly fits.

In the modification of FIGURES 4 and 6, a hollow ceramic filter block 40 has its chamber 41 partially filled with desiccant material 42. A shock pad 43 of fiberglass eliminates looseness in the material 42. In this species a perforated metallic cap 44 clamps a strainer 45 of heat cleaned woven glass cloth over the open end of the chamber 41. The structure and functioning of the FIGURE 4 device are otherwise substantially the same as those of the disclosure of FIGURES 1, 2, 3 and 7.

FIGURE 5 discloses a modified form of ceramic filter block 50 in which the chamber 51 thereof has a restricted filling opening 52 at the smaller end of said block, through which desiccant material 53 is inserted into the chamber 51. A pad of fiberglass 54 holds the material 53 in the chamber 51, the pad being retained in place by a perforated metallic cup 55 press fitted in the filling opening 52. The forward peripheral surface of the block is a narrow band like cylindrical area 56 of a diameter for being sealingly press fitted into a shell (not shown) similar to the shell 14 of FIGURES 1 and 2.

In the species of FIGURE 8 a porcelain filter block 57 is generally similar to the block 12 of FIGURE 3 but is much longer and/or slender. The block 57 has a chamber 57c substantially filled with granular or other loosely packing desiccant material 58 retained in the chamber by a perforated cap 59 of sheet metal or plastic. A pad 60 of fiberglass is interposed between the desiccant material and the cap 59 to serve both as a strainer at the discharge end of the chamber 57c and also as a resilient body for eliminating looseness in the desiccant material.

The cap 59 has an annular marginal flange 61 which snugly embraces a cylindrical rim at the larger end of the tapered block 57. The flange 61 serves as a sealing gasket between the block 57 and the inner surface of an initially open-ended sheet metal jacket 62 coaxially surrounding said block. The jacket 62 is closed by a cup-shaped metallic cap 63 having a trough-shaped peripheral flange 64 welded, brazed or otherwise sealingly fixed to the rim of the jacket 62. Conduit coupling fixtures 65 and 66 are coaxially fixed in inlet and outlet apertures in the cap 63 and the end wall 67 of the jacket 62, respectively. A compressed coil spring 68 holds the block 57 coaxially seated against the end wall 67 as shown in FIGURE 8.

The species of FIGURE 9 differs from that of FIGURE 8 only in the dimensional proportions of the parts (which proportions correspond more nearly to those of FIGURES 1-3). Accordingly, for simplification of the description, the parts of FIGURE 9 disclosure are designated by primed numerals corresponding to the same numerals, unprimed, employed to indicate their counterparts in the species of FIGURE 8.

While several forms of the invention have been shown and described herein, it will be readily apparent to those skilled in the art that many minor modifications may be made without departing from the spirit of the invention or the scope of the appended claims.

What is claimed is:

1. A device of the character described comprising: an elongated hollow body of rigid porous ceramic material having a closed end and an open end, a quantity of desiccant material in said body, a jacket surrounding and spaced from said body and having inwardly reduced end portions forming shoulders therewith, an inlet fitting in that end portion of said jacket adjacent the closed end of said body, an outlet fitting at the other end portion of said jacket, a compression spring interposed between the closed end of said body and the adjacent reduced portion of said jacket, an integrally formed outwardly extending annular flange at the open end portion of said body, a perforated metallic cap having a flange overlying the flange of said body and acting to contain said desiccant material within said body, and a fine woven strainer disc gripped marginally between said cap and the adjacent reduced end portion of said jacket, said body flange being in abutting press-fitted relation to said cap flange and said cap flange being in like relation to the adjacent shoulder.

2. A device as defined in claim 1 wherein said body is provided with a series of circumferentially spaced longitudinally extending grooves.

References Cited in the file of this patent

UNITED STATES PATENTS

| | | |
|---|---|---|
| 513,292 | Andrews | Jan. 23, 1894 |
| 1,629,269 | Hagg | May 17, 1927 |
| 2,593,132 | Gannon | Apr. 15, 1952 |
| 2,788,128 | Heine | Apr. 9, 1957 |
| 3,090,490 | Yocum | May 21, 1963 |

FOREIGN PATENTS

| | | |
|---|---|---|
| 631,419 | Canada | Nov. 21, 1961 |